March 21, 1967     D. N. POLASKI     3,309,998

GEAR PUMP WITH HEAT CONTROL

Filed Aug. 9, 1965

Inventor:
David N. Polaski
By Hofgren, Wegner,
Allen, Stellman & McCord,
Attys

United States Patent Office 3,309,998
Patented Mar. 21, 1967

3,309,998
GEAR PUMP WITH HEAT CONTROL
David N. Polaski, Rockford, Ill., assignor to Sundstrand Corporation, a corporation of Illinois
Filed Aug. 9, 1965, Ser. No. 478,243
5 Claims. (Cl. 103—126)

This invention relates generally to gear pumps and motors and more particularly to a thermal compensating device for such an apparatus.

In conventional gear pumps and motors, a pair of interengaging gears are rotatably mounted within a hydraulically sealed housing. The housing is usually constructed of two end plates adjacent the sides of the gears and a spacer plate surrounding the gears and fixed with respect to the end plates. The spacer plate, of course, determines the clearance between the sides of the gears and the end plates, and has heretofore been selected so that a proper clearance is achieved between the sides of the gears and the end plates at ambient temperature. In the design of gear pumps, this clearance is small enough to maintain a fluid seal between the sides of the gears and the end plates, but is large enough to prevent pick-up on the sides of the gears which otherwise would result from excessive friction. In this sense, pick-up refers to melting, gumming and binding of the engaging end plate and gear surfaces.

In such prior gear pumps and motors, elevated working temperatures of the fluid being pumped reduces this side clearance between the gears and the end plates. Once the side clearance is reduced, excessive heat may be generated at the interfaces of the end plates and the sides of the gears which eventually results in metal pick-up. Pick-up becomes inevitable as the boundary layer lubrication breaks down as a result of the thermal expansion of the parts. The reduction in this critical clearance between the sides of the gears and the end plates is due primarily to the slight difference in the coefficient of thermal expansion of the gears and the spacer plate surrounding the gears. An ancillary cause is the heat transfer of the pump or motor to the atmosphere which produces a temperature difference between the gears and the spacer plate.

It is, therefore, a primary object of the present invention to provide a gear pump or motor with a temperature compensating device which maintains the proper clearance between the sides of the gears and the housing at high operating temperatures.

Another object of the present invention is to provide a new and improved gear pump or motor of the type having rotatable gears on shafts mounted in bores in the housing with annular grooves in these bores adjacent the sides of the gears which permit the gears and the housing to thermally expand under elevated temperature operating conditions while maintaining an acceptable clearance between the gears and the housing. These grooves in the housing bores are close enough to the sides of the gears to permit axial deflection of the housing away from the gears. The location of the groove permits thermal expansion of the gears themselves and very importantly permits the thermal expansion of the housing end plates away from the gears rather than toward them.

A more specific object of the present invention is to provide a new and improved gear pump or motor with a temperature compensating device of the type described above wherein the annular grooves in the housing bores, which permit deflection of a portion of the housing, are spaced from but closely adjacent the end of bearings in the bores so that the bearings are adequately supported.

A further object of the present invention is to provide a new and improved gear pump or motor of the type described above wherein the annular deflection grooves in the gear mounting bores have a diameter approximately equal to the mean between the pitch circle diameter and the root diameter of the gears.

Other objects and advantages of the present invention will be readily apparent from the following detailed description taken in connection with the accompanying drawings, in which.

While an illustrative embodiment of the present invention is shown and will be described in detail herein, it should be understood that the principles of this invention are susceptible of embodiment in many different forms and that the present disclosure is not intended to limit the invention to the embodiment illustrated. The scope of the invention will be pointed out in the appended claims.

Figure 1:
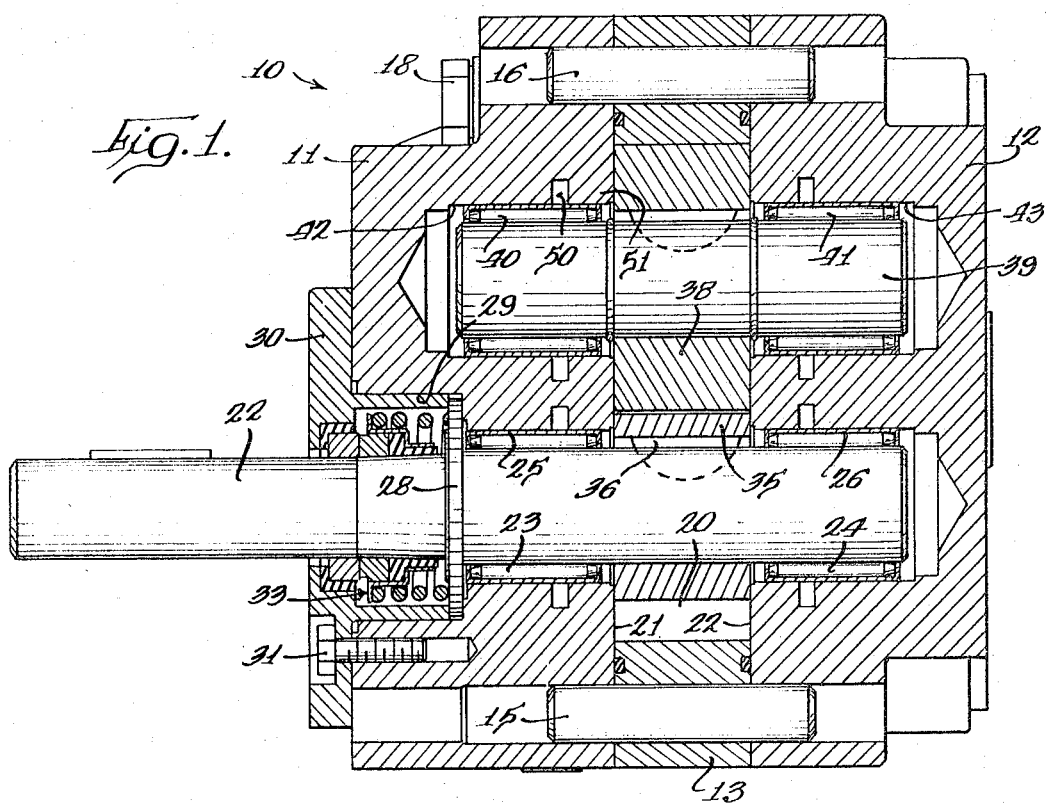
FIG. 1 is a cross sectional elevation of a gear pump embodying the present invention.

Referring to FIG. 1, a gear pump is shown generally designated by the numeral 10. As will be understood to those skilled in this art, this device could equally well be used as a motor for driving a load.

The gear pump 10 consists generally of a cylindrical mounting end plate or housing member 11, a porting end plate 12, and a spacer plate 13 therebetween. The end plates 11 and 12 and the spacer plate 13 are aligned by suitable dowel pins 15 and 16, and are fixed together as a housing unit by through bolts 18. The inner surface of the spacer plate 13 along with the parallel surfaces 21 and 22 on the end plates 11 and 12, respectively, define a fluid chamber 20 in the housing.

An input shaft 22 is rotatably mounted in needle bearings 23 and 24 which are in turn mounted in axially aligned bores 25 and 26 in the end plates 11 and 12, respectively. Shaft 22 is adapted to be driven by a suitable prime mover. An annular thrust shoulder 28 is formed on the shaft 22 to prevent axial movement of the shaft. Shoulder 28 is received in a counterbore 29 in the housing member 11 and is retained therein by a suitable pilot cap 30. The pilot cap 30 is fastened to the housing member 11 by suitable machine screws 31.

A shaft seal assembly 33 is provided within bore 29 to prevent the egress or leakage of hydraulic fluid from the end plate or housing member 11.

A drive gear 35 is mounted between the end plate surfaces 21 and 22 in chamber 20 on the right end of input shaft 22, to be driven thereby. Gear 35 is keyed to shaft 22 by a suitable key 36. Gear 35 interengages and rotates a driven gear 38 of identical design. Driven gear 38 is mounted on and keyed to a pinion shaft 39. Shaft 39 is rotatably mounted in needle bearings 40 and 41 seated respectively in axially aligned bores 42 and 43 in the end plates 11 and 12, respectively.

As the input shaft 22 rotates, the interengaging gears 35 and 38 rotate in chamber 20. The contracting and expanding chambers between the teeth on the gears and the inner surface of the spacer plate 13 serve to draw fluid into the chamber 20 and to compress it in a conventional fashion. Suitable inlet and exhaust ports (not shown) are provided in end plate 12 for conducting hydraulic fluid to and from the chamber 20.

A temperature compensating structure is provided in the end plates 11 and 12 to compensate for the thermal expansion of the gears 35, 38, end plates 11, 12 and spacer plate 13. It is necessary to maintain a proper clearance between the flat sides of the gears 35 and 38 and the end plate surfaces 21 and 22 to assure proper boundary layer lubrication of these surfaces and at the same time to maintain a fluid seal preventing the escape of fluid from chamber 20. In this respect, the bores 25, 26 are of lesser diameter than the root diameter of the gears, see FIG. 2.

Figure 2:
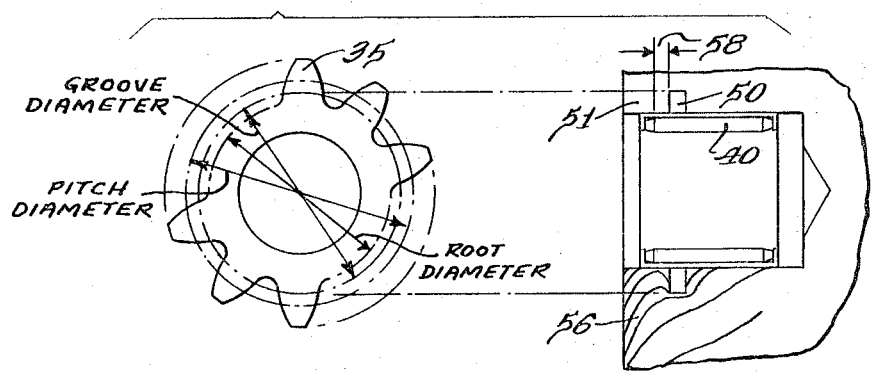
FIG. 2 is an exploded layout of one of the gears and one of the gear mounting bores in the housing.
Figure 3:
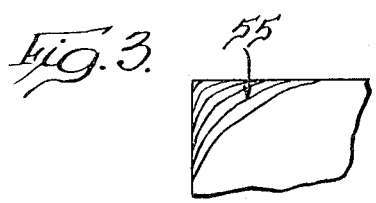
FIG. 3 is a fragmentary elevational view of a conventional gear mounting bore showing in a graphic form the lines of constant temperature.

To maintain running clearance, annular grooves 50 are formed in each of the bores adjacent the end plate surfaces 21 and 22. The grooves 50, together with the adjacent end plate surface 21 or 22, define annular deflectable projections 51 in the end plates. The grooves 50 are sufficiently close to the adjacent end plate surfaces 21, 22 to permit the projections 51 to deflect inwardly, i.e. away from the gears to compensate for the thermal expansion of the gears and housing. In this regard, FIG. 3 illustrates lines 55 of constant temperature in a conventional end plate without the present temperature compensating grooves 50. Lines 56, in FIG. 2, illustrate the constant temperature gradients in the present construction. It should be observed that heat is generated between the sides of the gears and the end plate surfaces 21 and 22 in this area under high temperature operating conditions.

As noted above, it is desirable to locate the grooves 20 as close as possible to the end plate surfaces 21 and 22. However, a sufficient distance, indicated at 58 in FIG. 2, should be provided between the inboard end of the bearings and the grooves 50 to allow for corner loading of the bearings. In one exemplary construction found suitable in the present device, the distance 58 was ⅛ of an inch.

As shown in FIG. 2, the diameter of the groove 50 is approximately the mean between the pitch circle diameter and the root diameter of the gears 35 and 38. The groove diameter, of course, must be larger than the root diameter of the gears to assure the proper side sealing of the gears. It is desirable that the groove diameter be as great as possible. However, there are practical limits on the greatest permissible diameter. Experience resulting from an examination of conventional gear units has indicated that pick-up (melting, gumming and binding of the sliding surfaces) on the sides of the gears occurs about midway between the pitch diameter and the root diameter of the gears. For this reason, the preferred diameter of the grooves is the mean between the pitch and root diameters. The width of the grooves 50 is as narrow as possible to assure long bearing life.

When operating the pump 10 under high temperature conditions, thermal expansion of the gears and the end plates adjacent the sides of the gears cause the projections 51 to deflect into the grooves 50. It should be noted that in conventional pump designs the thermal expansion of the end plates would be toward the gears and into the clearance resulting in a lubrication breakdown. The projections 51 thereby provide a construction which compensates for the thermal expansion of the pump elements and maintains a proper running clearance between the sides of the gears 35 and 38 and the end plate surfaces 21 and 22.

I claim:

1. A hydraulic fluid translating device, comprising; a first housing member, a second housing member, a generally annular spacer plate between said first and second housing members, means securing said housing members and spacer plate in axially fixed relation to each other defining a chamber therewithin, two pairs of axially aligned bores in said housing members opening to said chamber, a first power shaft rotatably mounted in one of said bores and extending from one of said housing members, a second shaft mounted in the other of said bores, interengaging gears mounted on said shafts defining expanding and contracting fluid chambers and adapted to deliver and receive fluid through one of said housing members, said spacer plate having a width to achieve a predetermined clearance between the sides of the gears and the housing members to maintain a fluid seal and boundary lubrication therebetween, and means for compensating for the thermal expansion of the housing members, the gears and the spacer plate including a hollow groove in each of said bores of sufficient size and located with respect to said chamber to permit axial deflection of said housing members into said grooves upon thermal expansion of the members, gears or plate, said fluid chambers being sealed from said grooves.

2. A hydraulic fluid translating device as defined in claim 1 wherein each of said gears has a predetermined root diameter and pitch circle diameter, said bores having a diameter less than said gear root diameter to assist in maintaining the fluid seal, said grooves being annular and closely spaced from said chamber to facilitate deflection, said grooves having a diameter approximately equal to the mean of the root diameter and pitch circle diameter of the gears.

3. A hydraulic fluid translating device as defined in claim 2, wherein said second shaft is rotatably mounted in the other of said bores, a bearing in each of said bores engaging the respective shafts mounted therein and extending across said grooves, said grooves being spaced from the chamber ends of the bearings to provide material between the grooves and the chamber to support the ends of the bearings in the bores.

4. A hydraulic fluid translating device as defined in claim 3, wherein each of said bearings is a needle bearing.

5. A hydraulic fluid translating device comprising: a first fixed housing member, a second fixed housing member, said housing members being generally parallel and spaced from one another defining therebetween a chamber, two pairs of axially aligned bores in said housing members opening to said chamber, a shaft rotatably supported in each pair of said bores, interengaging gears mounted on said shafts defining expanding and contracting fluid chambers and adapted to deliver and receive fluid through said housing members, said housing members having spaced flat sealing surfaces, said surfaces having a predetermined clearance with the sides of said gears to maintain therewith a fluid seal and boundary lubrication therebetween, and means for compensating for the thermal expansion of the housing members and gears including an annular groove in at least one of said bores each pair of sufficient size and spaced with respect to said chamber to permit the axial deflection of a portion of the housing members into said grooves upon thermal expansion of the members or gears, said fluid chambers being sealed from said grooves.

References Cited by the Examiner

UNITED STATES PATENTS

| | | | |
|---|---|---|---|
| 2,103,524 | 12/1937 | Ernst | 103—126 |
| 2,176,322 | 10/1939 | Barrett | 103—126 |
| 2,321,609 | 6/1943 | Marco | 103—126 |
| 2,824,524 | 2/1958 | Banker | 103—126 |
| 2,837,031 | 6/1958 | Ilune | 103—126 |
| 2,850,985 | 9/1958 | Kammerer | 103—126 |
| 2,878,757 | 3/1959 | Marco | 103—126 |
| 3,059,584 | 10/1962 | Cottell | 103—126 |
| 3,096,719 | 7/1963 | McAlvay | 103—126 |

FOREIGN PATENTS 525,761   9/1940   Great Britain.

DONLEY J. STOCKING, *Primary Examiner.*

WILBUR J. GOODLIN, *Examiner.*